(12) United States Patent
Popuri

(10) Patent No.: US 12,019,729 B2
(45) Date of Patent: Jun. 25, 2024

(54) METHOD AND SYSTEM FOR FACILITATING USER AUTHENTICATION VIA MULTIDIMENSIONAL PASSWORDS

(71) Applicant: JPMorgan Chase Bank, N.A., New York, NY (US)

(72) Inventor: Yashwanth Popuri, McKinney, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 260 days.

(21) Appl. No.: 17/659,969

(22) Filed: Apr. 20, 2022

(65) Prior Publication Data

US 2022/0391486 A1    Dec. 8, 2022

Related U.S. Application Data

(60) Provisional application No. 63/208,172, filed on Jun. 8, 2021.

(51) Int. Cl.
| | |
|---|---|
| *G06F 21/36* | (2013.01) |
| *G06F 3/0481* | (2022.01) |
| *G06T 11/60* | (2006.01) |

(52) U.S. Cl.
CPC ............ *G06F 21/36* (2013.01); *G06F 3/0481* (2013.01); *G06T 11/60* (2013.01); *G06T 2200/24* (2013.01)

(58) Field of Classification Search
CPC ........ G06F 21/36; G06F 3/0481; G06F 21/46; G06T 11/60; G06T 2200/24
See application file for complete search history.

(56) References Cited

U.S. PATENT DOCUMENTS

| | | | |
|---|---|---|---|
| 2010/0180336 A1* | 7/2010 | Jones | H04L 9/3226 726/19 |
| 2012/0102551 A1* | 4/2012 | Bidare | H04L 9/3226 726/4 |
| 2012/0159608 A1* | 6/2012 | Griffin | H04L 9/3226 726/16 |
| 2015/0121493 A1* | 4/2015 | Chen | H04L 63/168 726/6 |

* cited by examiner

*Primary Examiner* — El Hadji M Sall
(74) *Attorney, Agent, or Firm* — Greenblum & Bernstein, P.L.C.

(57) ABSTRACT

A method for facilitating user authentication via a graphical user interface is provided. The method includes receiving, via the graphical user interface, a request, the request including an access request; generating a graphical element based on a predetermined guideline; displaying, via the graphical user interface, the generated graphical element in response to the request; receiving, via the displayed graphical element, an input, the input including an alphabetic character, a numeric character, and a symbolic character; determining a dimensionality factor for the input; and authenticating the request by using the input and the corresponding dimensionality factor.

20 Claims, 7 Drawing Sheets

METHOD AND SYSTEM FOR FACILITATING USER AUTHENTICATION VIA MULTIDIMENSIONAL PASSWORDS

CROSS-REFERENCE TO RELATED APPLICATIONS

This application claims the benefit of U.S. Provisional Patent Application Ser. No. 63/208,172, filed Jun. 8, 2021, which is hereby incorporated by reference in its entirety.

BACKGROUND

1. Field of the Disclosure

This technology generally relates to methods and systems for user authentication, and more particularly to methods and systems for facilitating user authentication via a graphical user interface by using a graphical element to receive a multidimensional password.

2. Background Information

Many business entities utilize secret data such as, for example, a password to verify and authorize a user. The password, which is typically a string of characters that is known only by the user, is used to enable user access to sensitive information. Historically, use of conventional passwords to authenticate the user has resulted in varying degrees of success with respect to usability, functionality, and security.

One drawback of using conventional passwords to authenticate the user is that in many instances, the passwords are naïve and do not allow for use of different characteristics such as, for example, a dimensionality characteristic to facilitate user authentication. As a result, secured passwords are very complex and the user tends to use a similar, easy to remember password for several purposes. The use of a similar password across different platforms creates exploitable attack vectors. Additionally, conventional password alternatives such as, for example, biometric credentials may also create exploitable attack vectors when the biometric credentials are stolen.

Therefore, there is a need for a simple multidimensional password to facilitate authentication of the user that is easy and fun for the user to remember as well as reduce potential attack vectors.

SUMMARY

The present disclosure, through one or more of its various aspects, embodiments, and/or specific features or sub-components, provides, inter alia, various systems, servers, devices, methods, media, programs, and platforms for facilitating user authentication via a graphical user interface by using a graphical element to receive a multidimensional password.

According to an aspect of the present disclosure, a method for facilitating user authentication via a graphical user interface is disclosed. The method is implemented by at least one processor. The method may include receiving, via the graphical user interface, at least one request, the at least one request may include an access request; generating at least one graphical element based on at least one predetermined guideline; displaying, via the graphical user interface, the generated at least one graphical element in response to the at least one request; receiving, via the displayed at least one graphical element, at least one input, the at least one input may include at least one from among an alphabetic character, a numeric character, and a symbolic character of any language or script; determining a dimensionality factor for each of the at least one input; and authenticating the at least one request by using the at least one input and the corresponding dimensionality factor.

In accordance with an exemplary embodiment, the at least one graphical element may include at least one text field that is located on a plane of a multidimensional shape to receive the at least one input.

In accordance with an exemplary embodiment, the multidimensional shape may include any polyhedron that corresponds to at least one from among a cube, a rectangular cuboid, a tetrahedron, and a square pyramid.

In accordance with an exemplary embodiment, the at least one graphical element may include at least one selectable characteristic for each plane of the at least one graphical element that is usable to authenticate the at least one request, the at least one selectable characteristic may include a color.

In accordance with an exemplary embodiment, the at least one predetermined guideline may include at least one from among a shape of the at least one graphical element and a number of the at least one graphical element.

In accordance with an exemplary embodiment, the dimensionality factor may include information relating to a relative position of the at least one input, the relative position may correspond to a location of the at least one input on a plane of the at least one graphical element.

In accordance with an exemplary embodiment, the method may further include displaying, via a second graphical user interface, the generated at least one graphical element in response to the at least one request; and receiving, via the second graphical user interface, at least one second input.

In accordance with an exemplary embodiment, the method may further include determining a second dimensionality factor for each of the at least one second input; and authenticating, by using multi-factor authentication, the at least one request based on the at least one input, the dimensionality factor, the at least one second input, and the second dimensionality factor.

In accordance with an exemplary embodiment, the second graphical user interface may include a virtual reality interface that simulates a real-world environment, the virtual reality interface may correspond to at least one from among an augmented reality simulation and a mixed reality simulation.

According to an aspect of the present disclosure, a computing device configured to implement an execution of a method for facilitating user authentication via a graphical user interface is disclosed. The computing device including a processor; a memory; and a communication interface coupled to each of the processor and the memory, wherein the processor may be configured to receive, via the graphical user interface, at least one request, the at least one request may include an access request; generate at least one graphical element based on at least one predetermined guideline; display, via the graphical user interface, the generated at least one graphical element in response to the at least one request; receive, via the displayed at least one graphical element, at least one input, the at least one input may include at least one from among an alphabetic character, a numeric character, and a symbolic character; determine a dimensionality factor for each of the at least one input; and authenticate the at least one request by using the at least one input and the corresponding dimensionality factor.

In accordance with an exemplary embodiment, the at least one graphical element may include at least one text field that is located on a plane of a multidimensional shape to receive the at least one input.

In accordance with an exemplary embodiment, the multidimensional shape may include a polyhedron that corresponds to at least one from among a cube, a rectangular cuboid, a tetrahedron, and a square pyramid.

In accordance with an exemplary embodiment, the at least one graphical element may include at least one selectable characteristic for each plane of the at least one graphical element that is usable to authenticate the at least one request, the at least one selectable characteristic may include a color.

In accordance with an exemplary embodiment, the at least one predetermined guideline may include at least one from among a shape of the at least one graphical element and a number of the at least one graphical element.

In accordance with an exemplary embodiment, the dimensionality factor may include information relating to a relative position of the at least one input, the relative position may correspond to a location of the at least one input on a plane of the at least one graphical element.

In accordance with an exemplary embodiment, the processor may be further configured to display, via a second graphical user interface, the generated at least one graphical element in response to the at least one request; and receive, via the second graphical user interface, at least one second input.

In accordance with an exemplary embodiment, the processor may be further configured to determine a second dimensionality factor for each of the at least one second input; and authenticate, by using multi-factor authentication, the at least one request based on the at least one input, the dimensionality factor, the at least one second input, and the second dimensionality factor.

In accordance with an exemplary embodiment, the second graphical user interface may include a virtual reality interface that simulates a real-world environment, the virtual reality interface may correspond to at least one from among an augmented reality simulation and a mixed reality simulation.

According to an aspect of the present disclosure, a non-transitory computer readable storage medium storing instructions for facilitating user authentication via a graphical user interface is disclosed. The storage medium including executable code which, when executed by a processor, may cause the processor to receive, via the graphical user interface, at least one request, the at least one request may include an access request; generate at least one graphical element based on at least one predetermined guideline; display, via the graphical user interface, the generated at least one graphical element in response to the at least one request; receive, via the displayed at least one graphical element, at least one input, the at least one input may include at least one from among an alphabetic character, a numeric character, and a symbolic character; determine a dimensionality factor for each of the at least one input; and authenticate the at least one request by using the at least one input and the corresponding dimensionality factor.

In accordance with an exemplary embodiment, the at least one graphical element may include at least one text field that is located on a plane of a multidimensional shape to receive the at least one input.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
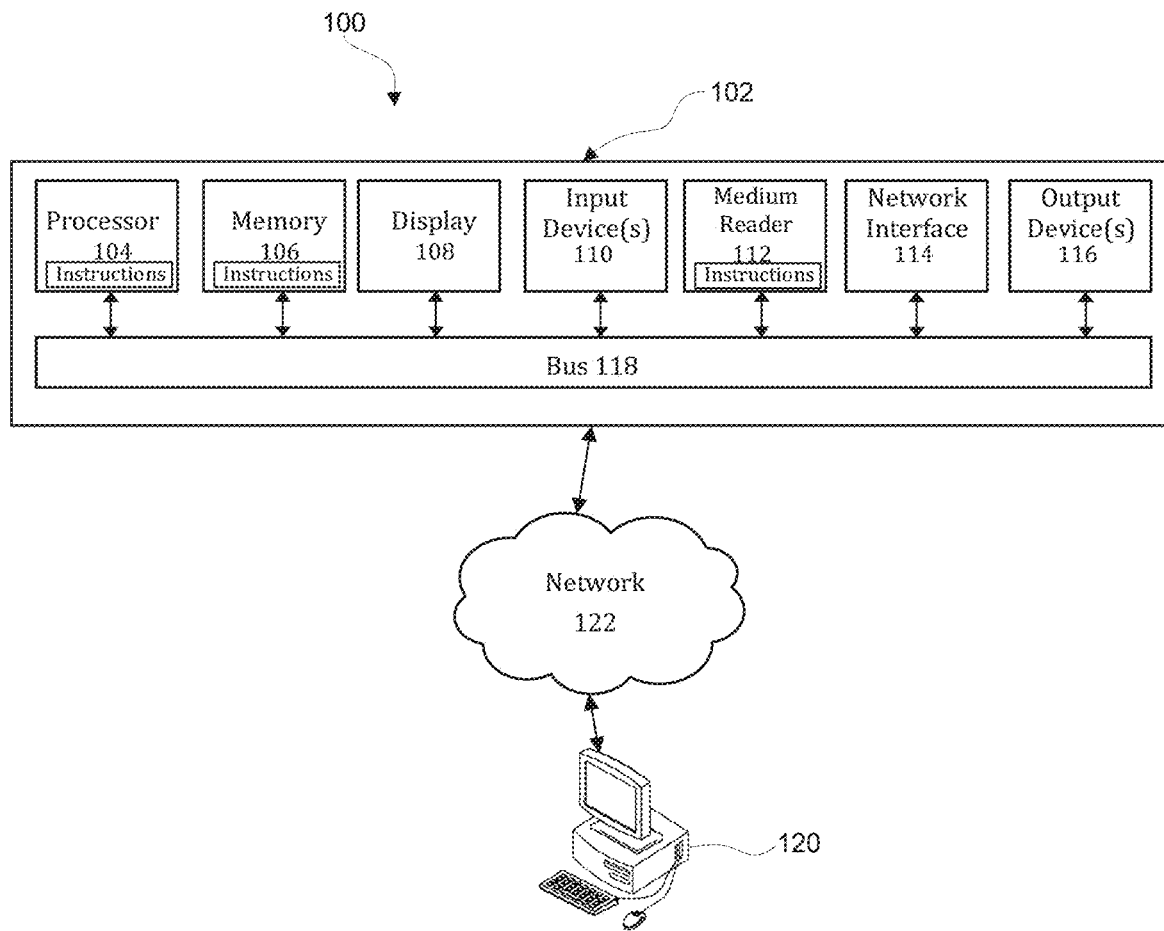
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating user authentication via a graphical user interface by using a graphical element to receive a multidimensional password.

Figure 2:
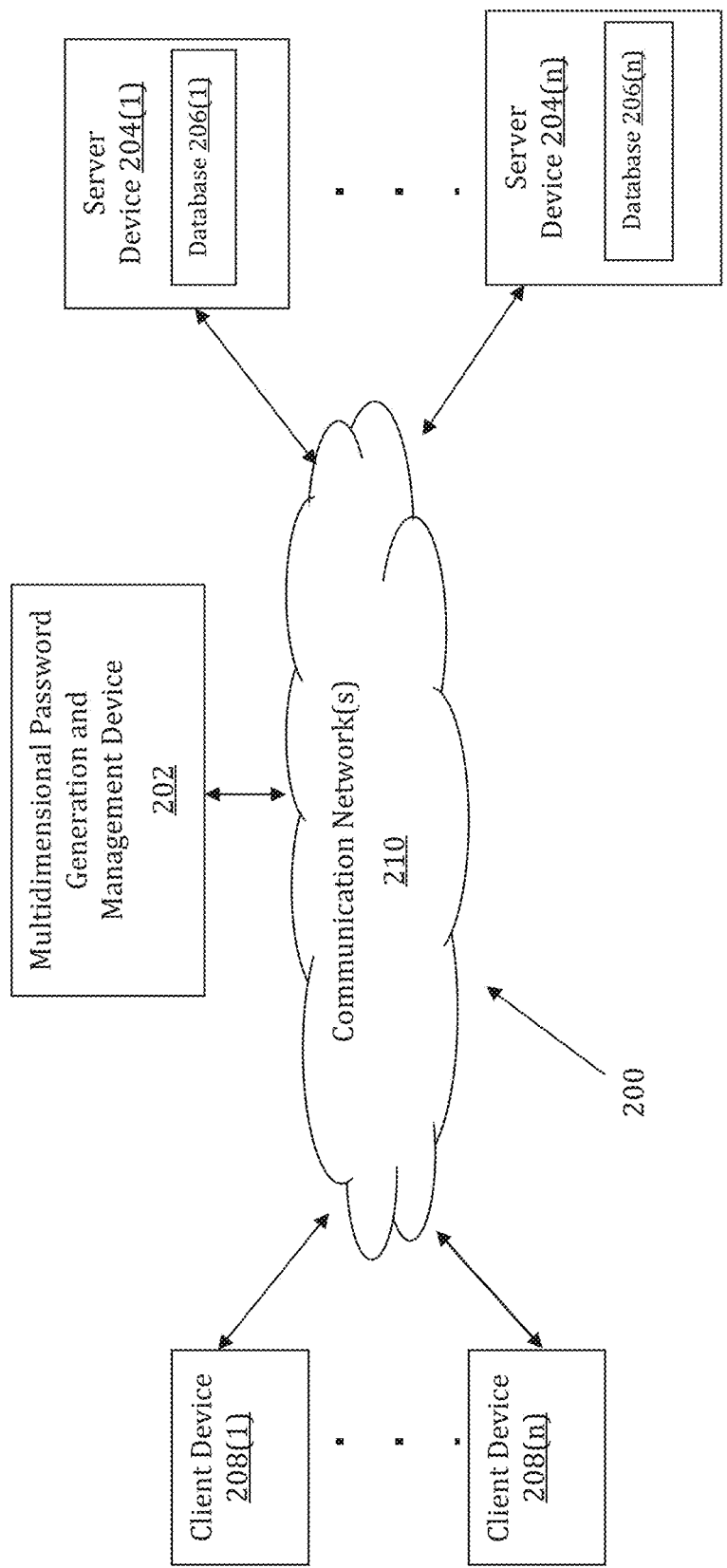
FIG. 2 illustrates an exemplary diagram of a network environment.

Referring to FIG. 2, a schematic of an exemplary network environment 200 for implementing a method for facilitating user authentication via a graphical user interface by using a graphical element to receive a multidimensional password is illustrated. In an exemplary embodiment, the method is executable on any networked computer platform, such as, for example, a personal computer (PC).

The method for facilitating user authentication via a graphical user interface by using a graphical element to receive a multidimensional password may be implemented by a Multidimensional Password Generation and Management (MPGM) device 202. The MPGM device 202 may be the same or similar to the computer system 102 as described with respect to FIG. 1. The MPGM device 202 may store one or more applications that can include executable instructions that, when executed by the MPGM device 202, cause the MPGM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MPGM device 202 itself, may be located in virtual server(s) running in a cloud-based computing environment rather than being tied to one or more specific physical network computing devices. Also, the application(s) may be running in one or more virtual machines (VMs) executing on the MPGM device 202. Additionally, in one or more embodiments of this technology, virtual machine(s) running on the MPGM device 202 may be managed or supervised by a hypervisor.

In the network environment 200 of FIG. 2, the MPGM device 202 is coupled to a plurality of server devices 204(1)-204(n) that hosts a plurality of databases 206(1)-206(n), and also to a plurality of client devices 208(1)-208(n) via communication network(s) 210. A communication interface of the MPGM device 202, such as the network interface 114 of the computer system 102 of FIG. 1, operatively couples and communicates between the MPGM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MPGM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and MPGM devices that efficiently implement a method for facilitating user authentication via a graphical user interface by using a graphical element to receive a multidimensional password.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MPGM device 202 may be a standalone device or integrated with one or more other devices or apparatuses, such as one or more of the server devices 204(1)-204(n), for example. In one particular example, the MPGM device 202 may include or be hosted by one of the server devices 204(1)-204(n), and other arrangements are also possible. Moreover, one or more of the devices of the MPGM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MPGM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to password data, user data, predetermined guideline data, graphical element data, graphical element characteristic data, multi-dimensional shape data, and dimensionality factor data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the MPGM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the MPGM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the MPGM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MPGM device 202, the server devices 204(1)-204(n), or the client devices 208(1)-208(n), for example, may be configured to operate as virtual instances on the same physical machine. In other words, one or more of the MPGM device 202, the server devices 204(1)-204(n), or the client devices 208(1)-208(n) may operate on the same physical device rather than as separate devices communicating through communication network(s) 210. Additionally, there may be more or fewer MPGM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
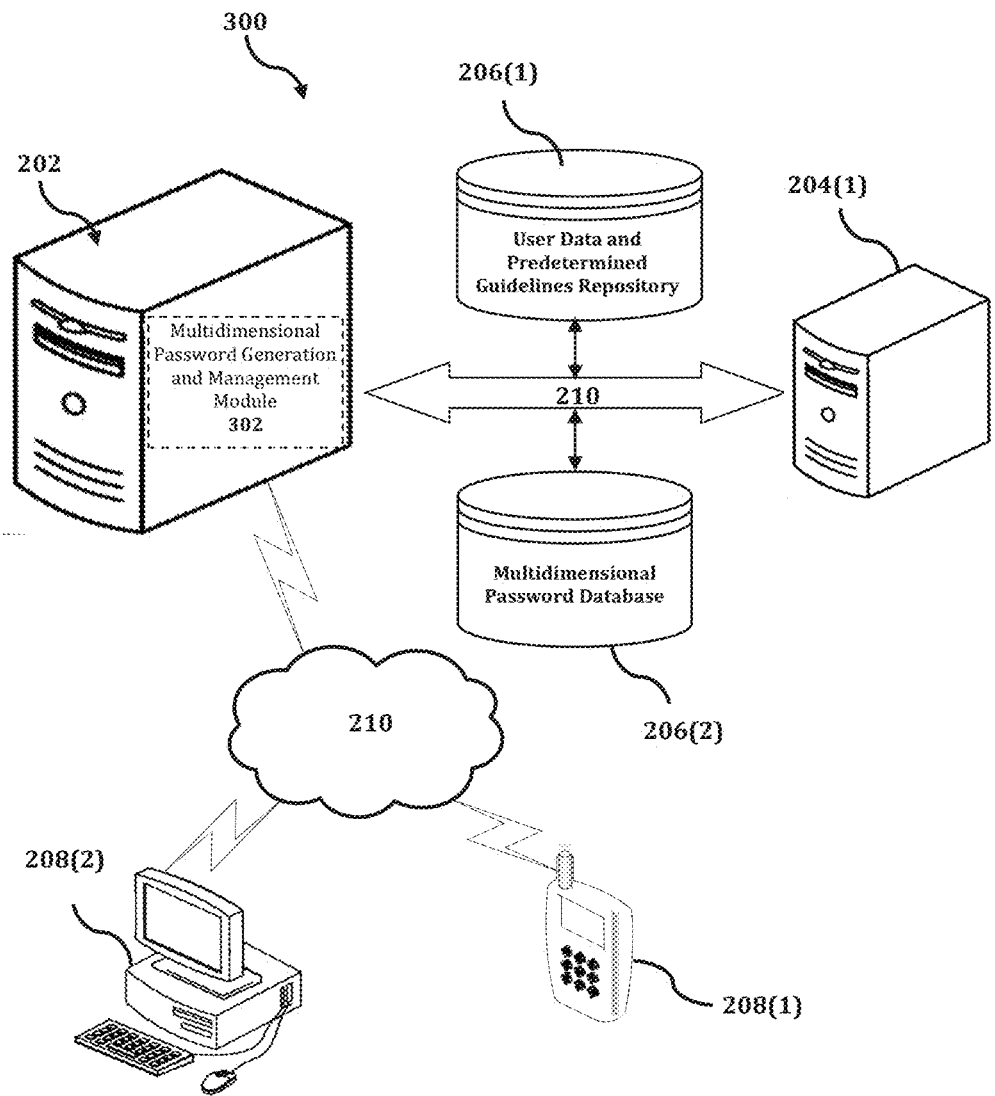
FIG. 3 shows an exemplary system for implementing a method for facilitating user authentication via a graphical user interface by using a graphical element to receive a multidimensional password.

The MPGM device 202 is described and shown in FIG. 3 as including a multidimensional password generation and management module 302, although it may include other rules, policies, modules, databases, or applications, for example. As will be described below, the multidimensional password generation and management module 302 is configured to implement a method for facilitating user authentication via a graphical user interface by using a graphical element to receive a multidimensional password.

An exemplary process 300 for implementing a mechanism for facilitating user authentication via a graphical user interface by using a graphical element to receive a multidimensional password by utilizing the network environment of FIG. 2 is shown as being executed in FIG. 3. Specifically, a first client device 208(1) and a second client device 208(2) are illustrated as being in communication with MPGM device 202. In this regard, the first client device 208(1) and the second client device 208(2) may be "clients" of the MPGM device 202 and are described herein as such. Nevertheless, it is to be known and understood that the first client device 208(1) and/or the second client device 208(2) need not necessarily be "clients" of the MPGM device 202, or any entity described in association therewith herein. Any additional or alternative relationship may exist between either or both of the first client device 208(1) and the second client device 208(2) and the MPGM device 202, or no relationship may exist.

Further, MPGM device 202 is illustrated as being able to access a user data and predetermined guidelines repository 206(1) and a multidimensional password database 206(2). The multidimensional password generation and management module 302 may be configured to access these databases for implementing a method for facilitating user authentication via a graphical user interface by using a graphical element to receive a multidimensional password.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the MPGM device 202 via broadband or cellular communication. Of course, these embodiments are merely exemplary and are not limiting or exhaustive.

Upon being started, the multidimensional password generation and management module 302 executes a process for facilitating user authentication via a graphical user interface by using a graphical element to receive a multidimensional password. An exemplary process for facilitating user authentication via a graphical user interface by using a graphical element to receive a multidimensional password is generally indicated at flowchart 400 in FIG. 4.

Figure 4:
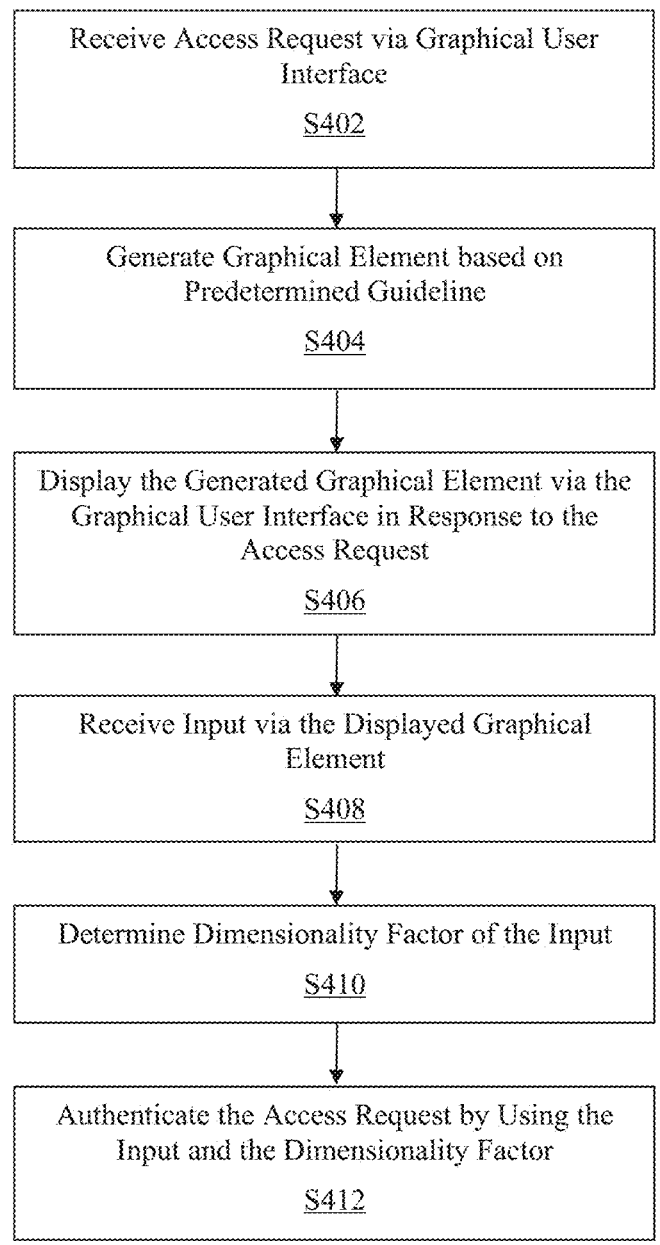
FIG. 4 is a flowchart of an exemplary process for implementing a method for facilitating user authentication via a graphical user interface by using a graphical element to receive a multidimensional password.

In the process 400 of FIG. 4, at step S402, a request may be received via a graphical user interface as well as any one of a plurality of interfaces corresponding to an application such as, for example, a web application, a mobile application, and any software-based application with user interaction. The request may include a user request to access data. For example, the request may relate to a user request to access transaction data via a web browser. In an exemplary embodiment, the request may include a system access request. For example, the request may relate to a system access request via a user device to connect with an enterprise network environment.

In another exemplary embodiment, the request may be initiated by the user based on a user interaction with the graphical user interface. For example, the request may be initiated by the user when the user selects a login button on a login screen. As will be appreciated by a person of ordinary skill in the art, the graphical user interface may relate to a user interface that allows users to interact with electronic devices though graphical icons such as, for example, a primary notation as well as audio indicators instead of text-based user interfaces.

At step S404, a graphical element based on a predetermined guideline may be generated. In an exemplary embodiment, the graphical element may include a text field that is located on a plane of a multidimensional shape. The text field may be configured to receive a user input. For example, the graphical element may include a text field for receiving a user input on a diagonal plane of a multidimensional shape. In another exemplary embodiment, the multidimensional shape may include a polyhedron that corresponds to at least one from among a cube, a rectangular cuboid, a tetrahedron, and a square pyramid. For example, the graphical element may correspond to a cube that includes a text field on a diagonal plane of the cube.

In another exemplary embodiment, the graphical element may include a selectable characteristic for each plane of the graphical element. The selectable characteristic may be usable to authenticate the received request. In another exemplary embodiment, the selectable characteristic of the graphical element may include a color. For example, a diagonal plane of the graphical element may be associated with a yellow color, which is verifiable based on a selection of the color by the user. As will be appreciated by a person of ordinary skill in the art, the graphical element may include any combination of colored and uncolored planes.

In another exemplary embodiment, the predetermined guideline may include at least one from among a shape of the graphical element and a number of the graphical elements to generate. The predetermined guideline may be based on a business rule such as, for example, a security rule as well as a predetermined user preference such as, for example, a length of the user password. For example, the predetermined guideline may indicate that the graphical element is generated as a cube shape with a certain orientation of diagonal planes. Similarly, the predetermined guideline may indicate that four graphical elements are required based on a four-character password of the user. Likewise, the predetermined guideline may also indicate that no consecutive characters or consecutive graphical elements can have the same orientation on consecutive planes.

At step S406, the generated graphical element may be displayed via the graphical user interface in response to the request. In an exemplary embodiment, the generated graphical element may be displayed in an interface such as, for example, a login page corresponding to the graphical user interface upon which the request was received. For example, in response to a request that was received on a mobile application, the generated graphical element may be displayed on a login page of the mobile application.

In another exemplary embodiment, the generated graphical element may be displayed in an interface that does not correspond to the graphical user interface upon which the request was received. For example, in response to a request that was received on a web browser, the generated graphical element may be displayed on a login page of a corresponding mobile application. As will be appreciated by a person of ordinary skill in the art, the generated graphical element may be displayable on a plurality of computing interfaces such as, for example, a screen of a computing device as well as a virtual reality interface that simulates a real-world environment. In another exemplary embodiment, the virtual reality interface may include simulations such as, for example, augmented reality simulations and mixed reality simulations.

At step S408, an input from the user may be received via the displayed graphical element. The input may include at least one from among an alphabetic character, a numeric character, and a symbolic character. In an exemplary embodiment, the input may correspond to a user password. For example, the user may interact with the displayed graphical element to provide the user password. In another exemplary embodiment, additional relevant data may be appended to the input. The additional relevant data may include user identifier data and environmental data such as, for example, a color of a particular plane of the graphical element. For example, a user identifier and information relating to the graphical element may be added to the input that is received from the user.

In another exemplary embodiment, the input may correspond to a four-character password that is unique to the user. Each of the four characters may be provided by the user on a plane for each of the four graphical elements. For example, a first character may be provided on a first plane of a first graphical element, a second character may be provided on a second plane of a second graphical element, and so forth. In another exemplary embodiment, the input may correspond to a password of any number of characters such as, for example, a six-character password and an eight-character password.

As will be appreciated by a person of ordinary skill in the art, for a cube with ten faces, four possible orientations of the character on each of the faces, and multiple possible directions (i.e., an inward direction and an outward direction as well as orientations on space diagonals and axial diagonals), a four-character password that is unique to the user would result in over four quadrillion possible combinations. As such, by using the dimensionality of the cube, a smaller attack vector is facilitated for a relatively simple password. Additionally, a snapshot of the input may not yield password information as orientation information is also required. For example, without orientation information, a letter "H" may be indistinguishable from a letter "I" that has been rotated by ninety degrees.

At step S410, a dimensionality factor for each of the received input may be determined. In an exemplary embodiment, the dimensionality factor may include information that relates to a relative position of the input. The relative position may correspond to a location of the input on a plane of the graphical element. For example, relative position information may indicate that the input was received from the user on a diagonal (i.e., spatial or axial) plane of the graphical element. In another exemplary embodiment, the dimensionality factor may be determined based on the relevant data that is appended to the input. For example, information relating to the graphical element that was appended to the input may be utilized to determine the relative position of the input.

At step S412, the request may be authenticated by using the input and the corresponding dimensionality factor. In an exemplary embodiment, the input and the corresponding dimensionality factor may be compared with known user information retrieved from a networked repository. For example, a user password from the input together with an orientation of the user password may be compared with known user information. In another exemplary embodiment, the input and the corresponding dimensionality factor may be converted into another format to facilitate the authentication of the user. For example, the input data and the corresponding dimensionality factor may be utilized to decrypt a user token that is then used to facilitate the authentication of the user. Additionally, the input data and the corresponding dimensionality factor may be hashed and compared against a stored hash to verify the integrity of the input data. In another exemplary embodiment, the input and the corresponding dimensionality factor may be processed and transmitted via an application programming interface to an authentication component of an enterprise network environment.

Figure 5:
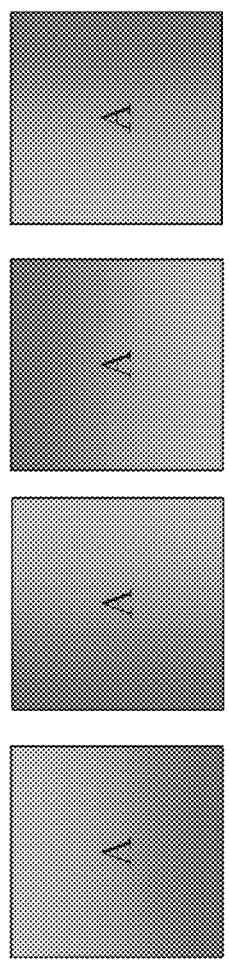
FIG. 5 is a diagram that illustrates an input orientation on a graphical user interface that is usable for implementing a method for facilitating user authentication via the graphical user interface by using a graphical element to receive a multidimensional password, according to an exemplary embodiment.

FIG. 5 is a diagram 500 that illustrates an input orientation on a graphical user interface that is usable for implementing a method for facilitating user authentication via the graphical user interface by using a graphical element to receive a multidimensional password, according to an exemplary embodiment.

As illustrated in FIG. 5, an orientation of an input character "A" may be used in combination with the character to facilitate authentication of a user. The input character may be received in four different orientations for each plane of a graphical element. As will be appreciated by a person of ordinary skill in the art, a number of different orientations for a plane of a graphical element may be limited by the multidimensional shape corresponding to the graphical element. For instance, each plane of a cube would provide four different orientations while each plane of a tetrahedron may provide three different orientations.

Figure 6:
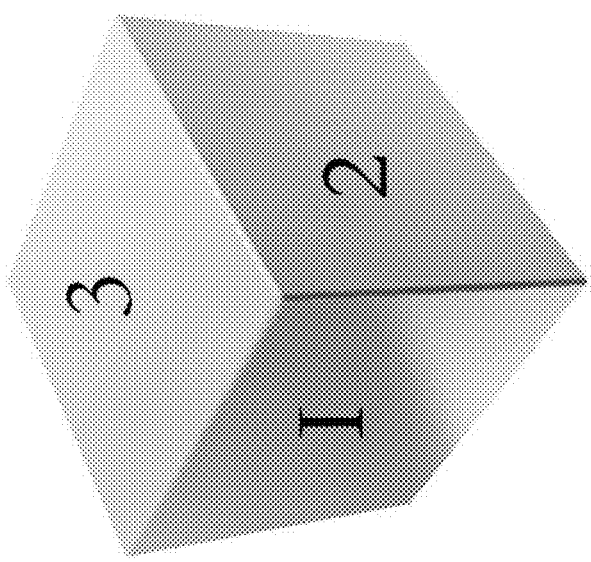
FIG. 6 is a screen shot that illustrates a graphical element that is usable for implementing a method for facilitating user authentication via a graphical user interface by using the graphical element to receive a multidimensional password, according to an exemplary embodiment.

FIG. 6 is a screen shot 600 that illustrates a graphical element that is usable for implementing a method for facilitating user authentication via a graphical user interface by using the graphical element to receive a multidimensional password, according to an exemplary embodiment.

As illustrated in FIG. 6, a graphical element corresponding to a cube may be utilized to receive input from a user. In an exemplary embodiment, a singular graphical element may be provided to receive the input. For example, a singular cube may be provided to receive a three-character password. In another exemplary embodiment, a plurality of graphical elements may be provided to receive the input. For example, three cubes may be provided to receive the three-character password such that each of the three cubes includes one of the three characters.

Figure 7:
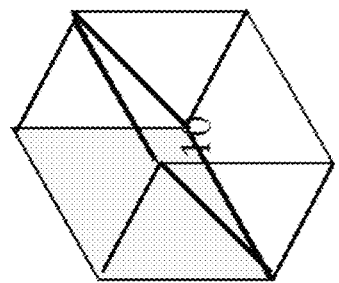
FIG. 7 is a diagram that illustrates a plurality of planes in a graphical element that is usable for implementing a method for facilitating user authentication via a graphical user interface by using the graphical element to receive a multidimensional password, according to an exemplary embodiment.
Figure 7:
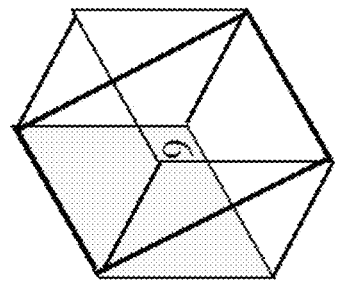
Figure 7:
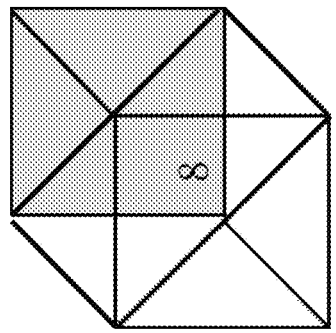
Figure 7:
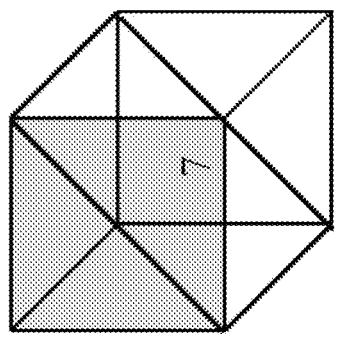

FIG. 7 is a diagram 700 that illustrates a plurality of planes in a graphical element that is usable for implementing a method for facilitating user authentication via a graphical user interface by using the graphical element to receive a multidimensional password, according to an exemplary embodiment. In FIG. 7, a single graphical element may include a plurality of planes.

As illustrated in FIG. 7, a plane titled "7" may correspond to a first diagonal plane that extends from a bottom left corner of the cube to a top right corner of the cube. Likewise, a plane titled "8" may correspond to a second diagonal plane that extends from a top left corner of the cube to a bottom right corner of the cube. Moreover, a plane titled "9" may correspond to a third diagonal plane that extends from a top back corner of the cube to a bottom front corner of the cube. Similarly, a plane titled "10" may correspond to a fourth diagonal plane that extends from a top front corner of the cube to a bottom back corner of the cube.

Accordingly, with this technology, an optimized process for facilitating user authentication via a graphical user interface by using a graphical element to receive a multidimensional password is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating user authentication via a graphical user interface, the method being implemented by at least one processor, the method comprising:
   receiving, by the at least one processor via the graphical user interface, at least one request, the at least one request including an access request;
   generating, by the at least one processor, at least one graphical element based on at least one predetermined guideline;
   displaying, by the at least one processor via the graphical user interface, the generated at least one graphical element in response to the at least one request;
   receiving, by the at least one processor via the displayed at least one graphical element, at least one input, the at least one input including at least one from among an alphabetic character, a numeric character, and a symbolic character;
   determining, by the at least one processor, a dimensionality factor for each of the at least one input; and
   authenticating, by the at least one processor, the at least one request by using the at least one input and the corresponding dimensionality factor.

2. The method of claim 1, wherein the at least one graphical element includes at least one text field that is located on a plane of a multidimensional shape to receive the at least one input.

3. The method of claim 2, wherein the multidimensional shape includes a polyhedron that corresponds to at least one from among a cube, a rectangular cuboid, a tetrahedron, and a square pyramid.

4. The method of claim 1, wherein the at least one graphical element includes at least one selectable characteristic for each plane of the at least one graphical element that is usable to authenticate the at least one request, the at least one selectable characteristic including a color.

5. The method of claim 1, wherein the at least one predetermined guideline includes at least one from among a shape of the at least one graphical element and a number of the at least one graphical element.

6. The method of claim 1, wherein the dimensionality factor includes information relating to a relative position of the at least one input, the relative position corresponding to a location of the at least one input on a plane of the at least one graphical element.

7. The method of claim 1, further comprising:
displaying, by the at least one processor via a second graphical user interface, the generated at least one graphical element in response to the at least one request; and
receiving, by the at least one processor via the second graphical user interface, at least one second input.

8. The method of claim 7, further comprising:
determining, by the at least one processor, a second dimensionality factor for each of the at least one second input; and
authenticating, by the at least one processor using multi-factor authentication, the at least one request based on the at least one input, the dimensionality factor, the at least one second input, and the second dimensionality factor.

9. The method of claim 7, wherein the second graphical user interface includes a virtual reality interface that simulates a real-world environment, the virtual reality interface corresponding to at least one from among an augmented reality simulation and a mixed reality simulation.

10. A computing device configured to implement an execution of a method for facilitating user authentication via a graphical user interface, the computing device comprising:
a processor;
a memory; and
a communication interface coupled to each of the processor and the memory,
wherein the processor is configured to:
receive, via the graphical user interface, at least one request, the at least one request including an access request;
generate at least one graphical element based on at least one predetermined guideline;
display, via the graphical user interface, the generated at least one graphical element in response to the at least one request;
receive, via the displayed at least one graphical element, at least one input, the at least one input including at least one from among an alphabetic character, a numeric character, and a symbolic character;
determine a dimensionality factor for each of the at least one input; and
authenticate the at least one request by using the at least one input and the corresponding dimensionality factor.

11. The computing device of claim 10, wherein the at least one graphical element includes at least one text field that is located on a plane of a multidimensional shape to receive the at least one input.

12. The computing device of claim 11, wherein the multidimensional shape includes a polyhedron that corresponds to at least one from among a cube, a rectangular cuboid, a tetrahedron, and a square pyramid.

13. The computing device of claim 10, wherein the at least one graphical element includes at least one selectable characteristic for each plane of the at least one graphical element that is usable to authenticate the at least one request, the at least one selectable characteristic including a color.

14. The computing device of claim 10, wherein the at least one predetermined guideline includes at least one from among a shape of the at least one graphical element and a number of the at least one graphical element.

15. The computing device of claim 10, wherein the dimensionality factor includes information relating to a relative position of the at least one input, the relative position corresponding to a location of the at least one input on a plane of the at least one graphical element.

16. The computing device of claim 10, wherein the processor is further configured to:
display, via a second graphical user interface, the generated at least one graphical element in response to the at least one request; and
receive, via the second graphical user interface, at least one second input.

17. The computing device of claim 16, wherein the processor is further configured to:
determine a second dimensionality factor for each of the at least one second input; and
authenticate, by using multi-factor authentication, the at least one request based on the at least one input, the dimensionality factor, the at least one second input, and the second dimensionality factor.

18. The computing device of claim 16, wherein the second graphical user interface includes a virtual reality interface that simulates a real-world environment, the virtual reality interface corresponding to at least one from among an augmented reality simulation and a mixed reality simulation.

19. A non-transitory computer readable storage medium storing instructions for facilitating user authentication via a graphical user interface, the storage medium comprising executable code which, when executed by a processor, causes the processor to:
receive, via the graphical user interface, at least one request, the at least one request including an access request;
generate at least one graphical element based on at least one predetermined guideline;
display, via the graphical user interface, the generated at least one graphical element in response to the at least one request;
receive, via the displayed at least one graphical element, at least one input, the at least one input including at least one from among an alphabetic character, a numeric character, and a symbolic character;
determine a dimensionality factor for each of the at least one input; and
authenticate the at least one request by using the at least one input and the corresponding dimensionality factor.

20. The storage medium of claim 19, wherein the at least one graphical element includes at least one text field that is located on a plane of a multidimensional shape to receive the at least one input.

* * * * *